Patented Oct. 5, 1948

2,450,810

UNITED STATES PATENT OFFICE 2,450,810

PROCESS FOR THE RECOVERY OF PROTEIN FROM PROTEINOUS MATERIALS

Anita V. Luisada Opper, New York, N. Y., and William P. ter Horst, Little Silver, N. J., assignors to Virginia Carolina Chemical Corporation, Richmond, Va., a corporation of Virginia No Drawing. Application November 8, 1945, Serial No. 627,526

5 Claims. (Cl. 260—112)

This invention relates to a process for the separation and recovery of protein from proteinous material such as peanuts, soya bean and the like in which the protein is present with other materials and from which it is recovered by dissolution in alkali and precipitation.

It is well known that protein is recovered from various protein materials and used for a variety of purposes such as the production of plastics, synthetic fibers, films, etc. A commonly used procedure is to extract the proteinous material with a water solution of caustic soda and then to precipitate the protein from the solution by means of an acid such as sulfurous acid. In the case of seeds containing protein such as peanut, soya bean, etc., it is common procedure to clean the seed as by removing the red skin of the peanut and then to grind the seed to a meal and extract its oil content by means of an organic solvent. Such preparatory treatments of the crude or raw proteinous material constitute no part of the present invention and in general have no bearing upon its operation or its results. The process of the present invention starts with the proteinous material in a condition suitable for the extraction of its protein content by dissolution by means of alkali or with the alkaline protein solution so obtained.

The invention resides generally in improving the recovery of protein without damaging it for most purposes such as for the production of adhesives, plastic bodies, films, filaments, etc., by incorporating urea into the alkaline protein solution from which solid protein is to be precipitated. The urea may be incorporated by adding it to the proteinous material prior to extraction of the protein or to the alkali solution used for the extraction or to the alkaline protein solution or at two or more of such points in the protein extraction and recovery process.

The addition of urea generally results in an increased recovery of protein which generally is useful for the same purposes as in protein which has been extracted and recovered in the same manner but without any addition of urea.

The precise mechanism of the action of the urea is not known but it appears probable that at least a part of the protein which normally is lost in the customary process of dissolving protein from proteinous material by means of alkali and recovering the dissolved protein from the resulting alkaline protein solution by precipitation by means of an acid is recovered when urea is present. This recovery may be explained by the theory that a part of the protein is not precipitated by acid and is lost in the mother liquor of the protein precipitate and that urea combines with such acid soluble protein to produce an acid insoluble or precipitable compound or complex. In other words, it appears that protein which is not precipitated in filterable form by acid alone is precipitated in filterable form by acid in the presence of urea.

The invention is illustrated by the following examples.

The general procedure followed for the extraction and recovery of the protein from the protein-containing material without addition of urea is as follows:

30 grams of protein-containing material such as peanut meal or soya bean meal after extraction of its oil content is suspended in 320 ml. of water and 6.2 ml. of protein solvent are added. The protein solvent consists of 10.6 grams of sodium hydroxide and 5.3 grams of sodium sulfite dissolved in sufficient water to make 250 ml. of solution. The mixture is stirred for 45 minutes at 45° C., cooled and filtered and the residue washed three times by being suspended in 100 ml. of water and filtered, the washings being added to the original filtrate. The residue is dried at 105° C. and its weight and nitrogen content determined. The protein solution (filtrate and washings) is heated for 30 minutes at 45° C. with stirring and then cooled and its pH value and nitrogen content determined. This heating is not necessary for obtaining the normal or increased protein yield. It is only included in the procedure to show that this heating alone does not increase the yield, but that the increase is only obtained when urea is added. Sulfurous acid is added to the solution until the pH value is 4.8 to 5. This results in precipitation of protein as a curd. The mixture is heated to 70° C., cooled, filtered, the curd on the filter washed with several small portions of water aggregating 50 ml., dried at 105° C., weighed and its nitrogen content determined.

In order to determine the effect of the addition of urea the above procedure is followed (1) without urea addition, (2) with addition of urea to the mixture of protein containing material, water and protein solvent prior to the step of heating at 45° C. for 45 minutes, (3) with addition of urea to the filtrate and washings of dissolved protein prior to the step of heating at 45° C. for 30 minutes and (4) at both points (2) and (3).

The results obtained are shown in the following data:

*Example 1.*—When the protein-containing material was peanut meal and no urea was added the protein recovered contained 72.9 percent of the nitrogen present in the peanut meal.

*Example 2.*—When the protein-containing material was peanut meal and 2 grams of urea were added to the protein solution filtrate, the recovered protein contained 81.5 percent of the nitrogen content of the peanut meal, this being an increase of about 8 percent in protein nitrogen recovery and representing a corresponding increase in protein recovery or a corresponding decrease in protein loss.

*Example 3.*—In this example, using peanut meal, 2 grams of urea were added to the mixture of peanut meal, water and protein solvent and the recovered protein contained about 79.5 percent of the nitrogen content of the meal or an increase, due to the addition of urea of about 6 percent.

*Example 4.*—In this example, using peanut meal, 2 grams of urea were added to the mixture of peanut meal, water and protein solvent and 4 grams of urea were added to the protein solution filtrate and the recovered protein contained 89.3 percent of the nitrogen content of the meal or an increase due to the addition of urea of about 16 percent.

Assuming experimental error it appears that the increased recovery of protein due to the addition of urea to the mixture of peanut meal and solvent and to the protein solution filtrate is about equal to the sum of the increases in protein recovery due to the addition of urea at each of these points separately.

*Example 5.*—When the above described procedure was carried out, substituting the peanut meal by an equal weight of soy bean flake the protein recovery without addition of urea represented 70.44 percent of the total nitrogen content of the meal.

*Example 6.*—Repeating the above described procedure, using soya bean flake and adding 2 grams of urea to the protein solution filtrate the nitrogen recovery was 74.65 percent, that is, an increase of about 4 percent as compared with the recovery when no urea was added.

*Example 7.*—The procedure described above was repeated, using soya bean meal and an addition of 4 grams of urea to the mixture of meal and protein solvent and the protein nitrogen recovery amounted to 73.86 per cent or a gain of about 3.5 percent.

*Example 8.*—When the procedure was repeated with soya bean meal and an addition of 4 grams of urea to the mixture of meal and protein solvent and a further addition of 4 grams of urea to the protein solution filtrate the protein nitrogen recovery was 73.85 percent, an increase of about 3.5 percent. Here, disregarding experimental error it appears that an increase in protein nitrogen recovery of about 4 percent is the maximum regardless of how much urea is added or at what point.

Considering all of the experiments represented by the eight examples it appears that the increased yield of protein nitrogen obtainable by the addition of urea varies with different protein sources, probably depending upon the character of the proteins in that source and more particularly upon the ratio of proteins which are rendered recoverable by precipitation by the addition of urea to proteins which are recoverable without the aid of urea. It further appears that the increased protein nitrogen recovery is substantially independent of the point in the procedure at which the urea is added but that the increased protein nitrogen recovery is proportional to the total urea addition up to a maximum point above which further additions of urea are substantially without effect on the protein nitrogen recovery.

The optimum addition of urea for each protein source must be determined experimentally by adding more and more urea in successive tests until no further increase in protein nitrogen recovery is produced. The optimum quantity is so different for the various sources of protein that an optimum addition of urea for all sources cannot be stated. As appears from the foregoing examples an addition of about 6 grams of urea for 30 grams of peanut meal gave the greatest increase in protein nitrogen recovery whereas 2 grams of urea for 30 grams of soya bean flake gave the maximum increase in protein nitrogen recovery.

The tests described in the foregoing examples were repeated with thiourea and with the readily water soluble mono substituted derivatives of both urea and thiourea and similar results i. e. similar increases in the yield or recovery of protein were obtained. Examples of mono substituted urea and thiourea tried are biuret, n-butylurea, phenylurea, allylurea, allylthiourea and phenylthiourea. Additions of thiourea and of the mono substituted derivatives of urea and thiourea of the same order as the additions of urea disclosed in the examples were used.

Disubstituted derivatives of urea and thiourea were found to be insufficiently soluble for use in the process.

The protein product will of course contain not only the proteins which are precipitatable by acid alone but those which are precipitatable by acid in the presence of the urea compound i. e. urea, thiourea and their mono substituted derivatives.

We claim:

1. In the process for the recovery of protein from a naturally occurring protein containing material selected from the group consisting of soya beans and peanuts involving dissolving the protein content of such materials in aqueous alkaline solution, separating the solution from insoluble material and precipitating protein from the resulting solution by acidification, the step which consists in incorporating a water soluble urea compound selected from the group consisting of urea, thiourea and their mono substituted derivatives into the protein solution.

2. Process as defined in claim 1 in which the urea compound is urea.

3. Process as defined in claim 1 in which the urea compound is thiourea.

4. Process as defined in claim 1 in which the urea compound is added to the mixture of protein containing material and aqueous alkaline solution.

5. Process as defined in claim 1 in which the urea compound is added to the separated solution of dissolved protein.

ANITA V. LUISADA OPPER.
WILLIAM P. TER HORST.

REFERENCES CITED

The following references are of record in the file of this patent:

UNITED STATES PATENTS

| Number | Name | Date |
|---|---|---|
| 1,813,387 | Davidson et al. | July 7, 1931 |
| 2,233,213 | Kniseley et al. | Feb. 25, 1941 |
| 2,358,383 | Chibnall et al. | Sept. 19, 1944 |

FOREIGN PATENTS

| Number | Country | Date |
|---|---|---|
| 306,168 | Great Britain | Feb. 12, 1929 |